E. F. W. ALEXANDERSON.
MEANS FOR FREQUENCY TRANSFORMATIONS.
APPLICATION FILED OCT. 6, 1916.
1,382,877.
Patented June 28, 1921.
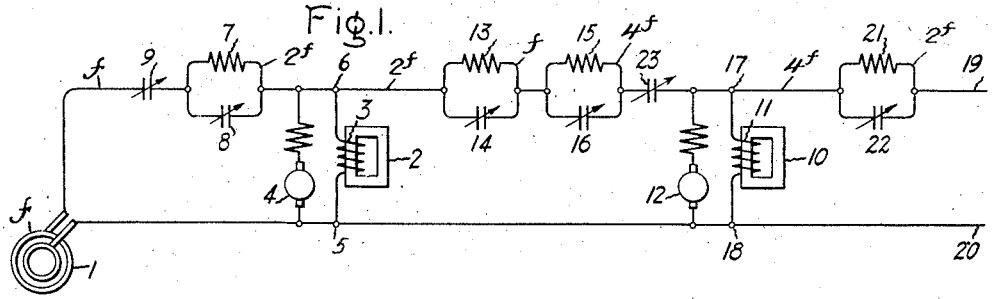
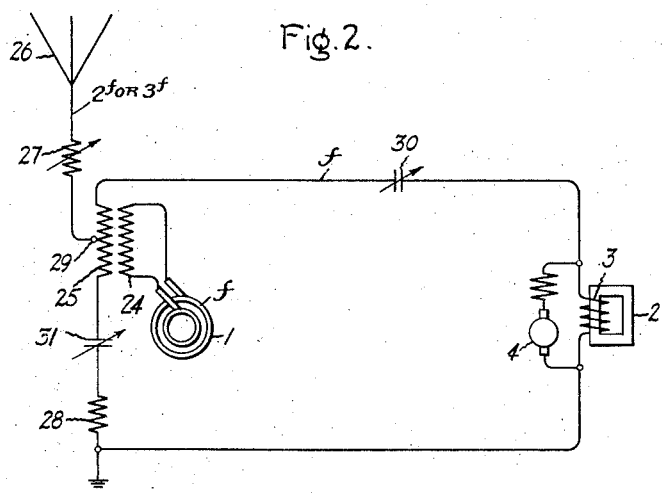
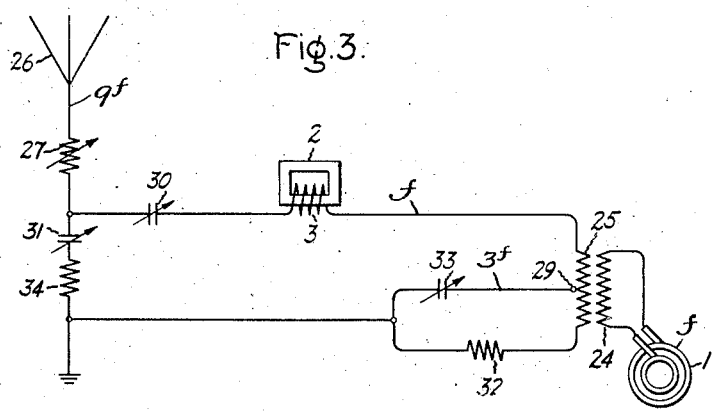
Inventor:
Ernst. F. W. Alexanderson
by
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

MEANS FOR FREQUENCY TRANSFORMATIONS.

1,382,877.     Specification of Letters Patent.     Patented June 28, 1921.

Application filed October 6, 1916. Serial No. 124,189.

*To all whom it may concern:*

Be it known that I, ERNST F. W. ALEXANDERSON, a citizen of the United States, residing at Schenectady, in the county of Schenectady, State of New York, have invented certain new and useful Improvements in Means for Frequency Transformations, of which the following is a specification.

My invention relates to the transformation of an alternating current of a given frequency into an alternating current of a different frequency.

For certain purposes, such for example, as wireless signaling, it is sometimes desirable to employ continuous alternating currents having a frequency much higher than can conveniently be obtained by means of a high frequency alternator. In order to obtain currents of the high frequency desired various arrangements have been employed for transforming a continuous alternating current of a given fundamental frequency in such a way as to derive therefrom a current having a frequency harmonic to the fundamental frequency. In some of these systems means are provided for distorting the wave of the current of fundamental frequency from the sine form in such a way that certain harmonics are made prominent and these harmonics are segregated in circuits which are resonant to the particular harmonic or harmonics which are to be utilized.

One of the objects of my invention is to improve the efficiency of operation of systems of the above mentioned type. A further object of my invention is to simplify the means for impressing the high frequency current obtained by such means upon a wireless radiating system. A still further object of my invention is to provide a system in which any desired harmonic of the fundamental frequency may be obtained by merely varying the tuning of the radiating system.

In carrying my invention into effect I employ an iron core inductance through which the current from the alternator flows and operate it in such a way that it becomes saturated and thereby produces a distorted voltage wave at its terminals. The circuit which includes this inductance and the source of current of fundamental frequency is preferably resonant to the fundamental frequency and is so adjusted that it offers a relatively very high impedance to the flow of current of the harmonic frequency which is to be utilized. The distorted voltage wave produced is applied to a second circuit which is resonant to the desired harmonic frequency. This second circuit may also be so adjusted that it offers a high impedance to current of the fundamental frequency or other means may be employed for preventing current of the fundamental frequency from flowing in the second circuit, and vice versa. If it is desired to produce a current having a frequency equal to an even harmonic of the fundamental the iron core inductance may be saturated by means of a direct current. If an odd harmonic is to be utilized this will not be necessary, although in some cases a small amount of direct current may be utilized to assist in tuning.

The features of my invention which I consider novel are pointed out with particularity in the appended claims. My invention itself, however, both as to its organization and method of operation together with further advantages thereof will best be understood by reference to the following description taken in connection with the accompanying drawing in which Figure 1 shows diagrammatically one way in which my invention may be carried into effect; Fig. 2 shows a method of applying it to a wireless radiating system; and Fig. 3 shows a modification.

As indicated in Fig. 1 a high frequency alternator 1 supplies current to a circuit which includes an inductance made up of a closed iron core 2 and a winding 3. The winding 3 is also supplied with direct current from a suitable source 4, the value of the current thus supplied being adjusted to provide the desired degree of saturation in the core 2. By this means the voltage wave produced at the terminals 5, 6, of the winding 3, will be distorted and by connecting these terminals to a working circuit which is resonant to twice the frequency of the alternator 1 a current may be obtained in the working circuit of double the frequency of the current supplied by alternator 1. To prevent such a double frequency current from flowing in the circuit of alternator 1 I employ in that circuit what may be termed a "frequency trap," that is, a device which offers a substantially infinite impedance to current of one particular frequency but comparatively low impedance to currents of different frequencies. This frequency trap consists of an inductance 7 and variable capacity 8 in multiple to each other and tuned for the double frequency. By means of the variable condenser 9 the circuit may be tuned to the frequency of alternator 1. In the present illustration the secondary circuit connected to the terminals 5, 6, is also the primary circuit of a second frequency transforming arrangement similar to the first, and includes an inductance made up of a closed iron core 10 and a winding 11, the winding 11 being also supplied with direct current from the source 12. A frequency trap consisting of inductance 13 and variable condenser 14, connected in multiple and tuned for the frequency of the alternator 1, will cause the secondary circuit to offer a high impedance to current of the fundamental frequency. A frequency trap consisting of inductance 15 and variable condenser 16 connected in multiple and tuned to four times the frequency of alternator 1 will cause the secondary circuit to offer a high impedance to current of that frequency and compel such current to flow in a work circuit connected to the terminals 17, 18 of winding 11, and including conductors 19 and 20. The frequency trap consisting of inductance 21 and variable condenser 22 connected in multiple in the work circuit and tuned to twice the frequency of alternator 1 will cause the work circuit to offer a high impedance to current of that frequency. By means of the condenser 23 the secondary circuit may be tuned to twice the frequency of the alternator 1. I have indicated in the drawing by the letters $f$, etc., the frequencies of the currents flowing in the different portions of the system and the frequencies for which the various traps may be tuned.

It will be apparent from the above description that by connecting additional frequency transforming arrangements in series with the two shown it will be possible to secure currents of any high frequency desired. The arrangement described above permits of the use of a single saturated core and a single winding therefor to effect a transformation of frequency, whereas all of the prior systems of this nature employing a saturated iron core inductance, of which I am aware, require the use of two separate cores and separate windings for the same. Since the principal source of loss in such a system for frequency transformation is in the iron core and its windings an appreciable improvement in efficiency may be made by using a single core.

In applying my system of frequency transformation to the production of high frequency current for the operation of a wireless radiating system I have found that further simplifications and improvements may be made. These improvements are indicated in Fig. 2 in which the high frequency alternator 1 supplies current to the primary 24 of a transformer, the secondary 25 of which is included in the local circuit which comprises the winding 3 of the iron core inductance. The load circuit in this case comprises an antenna 26 provided with the usual tuning inductance 27. The frequency trap which is employed in this case to give the local circuit a high impedance to the higher frequency current comprises an inductance 28 which is so arranged that the capacity of the antenna serves in place of the condenser employed with the form of frequency trap shown in Fig. 1. The current of harmonic frequency may be considered as being introduced into the antenna at the point 29 at which the antenna is connected to the secondary 25. From this point there are two parallel branches of the circuit through which current can flow; one through the inductance 27, antenna 26 and the capacity of the antenna to earth, and the other through a portion of secondary 25 and inductance 28 to earth. Since these two multiple branches are tuned so as to be resonant to the desired harmonic frequency there will be a large circulating current produced between the two branches. This circulating current will be the current which produces radiation.

In order to prevent the current of a harmonic frequency from flowing through the alternator the point 29 at which the antenna is connected to secondary 25 is so chosen that the higher frequency current balances in the two sides of the secondary winding and the inductive effect upon the primary winding 24 is thereby neutralized. The method of operation whereby this neutralization is effected may be explained as follows:—
When the system is adjusted as described so that the antenna itself serves as a part of the frequency trap the current circulating between the antenna and the inductance of the trap will be greater than the energy current furnished by the frequency transformer. In other words, the frequency trap acts as a transformer from a higher voltage and a lower current to a lower voltage and a higher current. The antenna current is the sum of the current flowing in the inductance 28 of the frequency trap and the current delivered from the saturated core inductance. Suppose, for example, that with an antenna current of ten amperes, five amperes is delivered from the saturated core inductance and the other five amperes is added by the resonant condition in the frequency trap. It will be apparent that if the antenna proper were connected directly to the lower end of the secondary 25 the five amperes delivered from the saturated core inductance would be effective in inducing a current in the alternator circuit comprising the alternator 1 and the primary 24. If, on the other hand, the antenna were connected to the top of secondary 25 the five amperes derived from the frequency trap would flow through the secondary 25 and be effective in inducing a current in the alternator circuit. In either case there would be undesirable losses in the alternator circuit due to the circulation of the higher frequency current therein. By connecting the antenna to the middle point of the secondary 25, however, the five amperes delivered by one branch of the higher frequency circuit will balance the five amperes delivered by the other branch and thereby neutralize the induction in the transformer and avoid the incidental losses. The current delivered to the antenna from the saturated core inductance may be considered as flowing downward through the upper part of secondary 25 and upward in the antenna. In order that the current supplied by the frequency trap shall add to this current it also must flow upward in the antenna and hence upward through the inductance 28 and the lower part of secondary 25. From this analysis it will be evident that the harmonic frequency currents in the two portions of secondary 25 are in opposite directions. While in the example given the connection should be made at the middle point of secondary 25, in case the currents do not divide equally in the two branches of the higher frequency circuit the connection may be made at some other point so chosen that a balance between the two currents will be obtained.

The system of frequency transformation thus described has the advantage that it is not limited in its operation to the use of any particular harmonic of the fundamental frequency. In order to bring out any one harmonic it is only necessary that the frequency trap should be tuned to that particular harmonic. Since the antenna itself forms a part of the frequency trap it is only necessary to tune the antenna for the particular frequency desired without any change in the rest of the system. In developing the even harmonics the direct current saturation of the core 2 should be employed while for the development of the odd harmonics direct current saturation will be unnecessary. It may be desirable in some cases, however, to employ a small amount of direct current in the winding 3 in order to assist in tuning.

The local circuit of the fundamental frequency may be tuned by means of the variable condensers 30 and 31. With the arrangement above described a portion of the voltage of fundamental frequency is impressed directly upon the antenna. By giving the capacity of condenser 31 such a value as to compensate for the inductance of the frequency trap at the fundamental frequency the wattless component of this voltage may be neutralized, and by varying the point 29 of connection between the antenna and secondary 25 the power component of this voltage of fundamental frequency may be neutralized. It may happen that the same point of connection will be suitable for neutralizing both the higher frequency current in the primary circuit and the fundamental frequency current in the antenna circuit. If this is not the case a point of connection may be employed which is intermediate the neutralizing points in order that both losses may be made small.

While the arrangement shown in Fig. 2 may be utilized for obtaining currents of a frequency higher than the second or third harmonic it may be desirable in case such higher frequency currents are to be utilized, to employ a frequency trap in the circuit tuned to a lower harmonic to assist in accentuating the higher harmonics of the fundamental. In Fig. 3 I have illustrated such an arrangement. In this arrangement the frequency trap comprising inductance 32 and capacity 33 in multiple is tuned to the lower harmonic frequency and the frequency trap which comprises the inductance 34 and the capacity of the antenna is tuned to the higher harmonic frequency. Suppose, for example, it were desired to obtain a current having a frequency equal to that of the ninth harmonic of the source 1, then the first trap would be tuned to the triple harmonic and the second trap to the ninth harmonic. By the use of the triple harmonic trap an additional distortion is introduced in the magnetic flux of the saturated core and this additional distortion has the effect of increasing the electromotive force of the ninth harmonic. In this case, as in the arrangement shown in Fig. 2, the effect of the third harmonic in the primary 24 is neutralized and the ninth harmonic will have no effect upon the primary circuit since it will be confined to the second frequency trap. In case the even harmonics are to be utilized the winding 3 will be supplied by a source of direct current as indicated in Figs. 1 and 2.

What I claim as new and desire to secure by Letters Patent of the United States, is:—

1. Means for producing high frequency alternating currents comprising a source of alternating current of a fundamental frequency, an electric circuit connected to said source which is resonant to the frequency of said source, said circuit including a winding surrounding a core of magnetic material whereby the wave form of the current may be distorted, a source of direct current also connected to said winding to saturate said core, a second circuit which is resonant to a frequency harmonic to the fundamental frequency associated with said first circuit, and a frequency trap in the first circuit comprising an inductance and capacity in multiple tuned for the harmonic frequency.

2. Means for producing high frequency alternating currents comprising a source of alternating current of a fundamental frequency, an electric circuit connected to said source which is resonant to the frequency of said source, said circuit including a winding surrounding a core of magnetic material whereby the wave form of the current may be distorted, a source of direct current also connected to said winding to saturate said core, a second circuit which is resonant to a frequency harmonic to the fundamental frequency associated with said first circuit, a frequency trap in the first circuit comprising an inductance and capacity in multiple tuned for the harmonic frequency, and means for preventing current of the fundamental frequency from circulating in the second circuit.

3. Means for producing high frequency currents comprising a source of alternating current of a fundamental frequency, an electric circuit connected to said source having therein means for distorting the wave form of the current derived from said source whereby alternating currents of frequencies harmonic to the fundamental frequency may be produced, a frequency trap comprising an inductance and capacity in multiple in said circuit tuned for a desired harmonic frequency, a second circuit associated with the first circuit which is resonant to the frequency of the desired harmonic, and means for preventing current of the fundamental frequency from circulating in said second circuit.

4. Means for producing high frequency currents comprising a source of alternating current of a fundamental frequency, an electric circuit connected to said source having therein means for distorting the wave form of the current derived from said source whereby alternating currents of frequencies harmonic to the fundamental frequency may be produced, said circuit being so proportioned and arranged as to prevent current of a desired harmonic frequency from flowing through said source and to offer a comparatively low impedance to currents of other frequencies, a second circuit associated with said first circuit which is resonant to the frequency of the desired harmonic, and means for preventing current of the fundamental frequency from circulating in the second circuit.

5. Means for producing high frequency currents comprising a source of alternating current of a fundamental frequency, an electric circuit connected to said source which is resonant to the fundamental frequency and having means therein for distorting the wave form of the current derived from said source, and a frequency trap in said circuit comprising an inductance and capacity in multiple tuned for a frequency harmonic to the fundamental.

6. Means for producing high frequency currents comprising a source of alternating current of a fundamental frequency, an electric circuit connected to said source having means therein for distorting the wave form of the current derived from said source, a frequency trap in said circuit comprising an inductance and capacity in multiple tuned for a frequency harmonic to the fundamental, a second circuit associated with said first circuit, and means for preventing current of the fundamental frequency from circulating in said second circuit.

7. Means for producing high frequency currents comprising a source of alternating current of a fundamental frequency, an electric circuit connected to said source which is resonant to the frequency of said source and which includes a winding surrounding a core of magnetic material whereby the wave form of the current derived from said source may be distorted, a source of direct current also connected to said winding to saturate said core, and a frequency trap in said circuit comprising an inductance and capacity in multiple tuned for a frequency harmonic to the fundamental.

8. Means for producing high frequency currents comprising a source of alternating current of a fundamental frequency, an electric circuit connected to said source which includes a winding surrounding a core of magnetic material, whereby the wave form of the current derived from said source may be distorted, said circuit being so adjusted as to prevent current of a frequency harmonic to the fundamental from flowing through said source and to offer a comparatively low impedance to currents of other frequencies, a second circuit associated with said first circuit, and means for preventing currents of a frequency equal to that of the source from circulating in said second circuit.

9. Means for producing high frequency currents comprising a source of alternating current of a fundamental frequency, an electric circuit connected to said source which includes a single winding surrounding a core of magnetic material, whereby the wave form of the current derived from said source may be distorted, a frequency trap in said circuit comprising an inductance and capacity in multiple tuned for a frequency harmonic to the fundamental, a second circuit associated with said first circuit, and means for preventing current of the fundamental frequency from circulating in said second circuit.

10. Means for producing high frequency currents comprising a source of alternating current of a fundamental frequency, an electric circuit associated with said source which is resonant to the frequency of said source and which includes a single high frequency winding surrounding a core of magnetic material whereby the wave form of the current derived from the source will be distorted, and alternating currents of frequencies harmonic to the fundamental may be produced, means for supplying a constant magnetizing current to said winding and means for preventing current of a desired harmonic frequency from flowing through said source.

11. The combination in a system of distribution of a source of alternating current of a fundamental frequency, an electric circuit connected to said source which includes a winding surrounding a core of magnetic material and a plurality of frequency traps in series in said circuit, each frequency trap comprising a capacity and inductance connected in multiple and the different traps being tuned for different harmonics of the fundamental frequency.

12. Means for producing electromagnetic waves comprising a source of alternating current, an electric circuit connected to said source, an antenna included in said circuit, and a frequency trap in series in said circuit comprising an inductance in multiple with the capacity of the antenna and tuned to a frequency harmonic to that of the source.

13. Means for producing electromagnetic waves comprising a source of alternating current, an electric circuit connected to said source, which includes a winding surrounding a core of magnetic material for distorting the wave form of the current in said circuit, an antenna in said circuit and a frequency trap in said circuit comprising an inductance and capacity in multiple tuned for a frequency harmonic to that of the source.

14. Means for producing electromagnetic waves comprising a source of alternating current, an electric circuit connected to said source which includes means for distorting the wave form of the current therein, a frequency trap in said circuit comprising an inductance and capacity in multiple tuned for a frequency harmonic to that of the source, an antenna in said circuit, and a second frequency trap in said circuit comprising an inductance in multiple with the capacity of the antenna, the second frequency trap being tuned to a harmonic frequency which is a multiple of the one for which the first frequency trap is tuned.

15. Means for producing high frequency currents comprising a source of alternating current of a fundamental frequency, an electric circuit associated with said source which is resonant to the fundamental frequency and having means therein for distorting the wave form of the current derived from said source, a frequency trap associated with said circuit comprising an inductance and capacity in multiple tuned for a frequency harmonic to the fundamental, and means for preventing current of the harmonic frequency from circulating in said source.

16. Means for producing electromagnetic waves comprising a source of alternating current, an electric circuit associated with said source, an antenna associated with said circuit, a frequency trap in said circuit comprising an inductance in multiple with the capacity of the antenna and tuned to a frequency harmonic to that of the source, and means for preventing current of the fundamental frequency from flowing in said antenna.

17. Means for producing electromagnetic waves comprising a source of alternating current, an electric circuit associated with said source, an antenna associated with said circuit, a frequency trap in said circuit comprising an inductance in multiple with the capacity of the antenna and tuned to a frequency harmonic to that of the source, and means for preventing current of the harmonic frequency from circulating in said source.

18. The combination in a system of distribution of a source of alternating current of a fundamental frequency, a work circuit, means for supplying to said work circuit electric energy derived from said source in the form of a current of different characteristic from that produced in the source, and a frequency trap in said work circuit comprising an inductance and capacity connected in multiple and tuned to the frequency of said source.

19. Means for producing electromagnetic waves comprising a source of alternating current of a fundamental frequency, an electric circuit associated therewith having means therein for distorting the wave form of the current derived from said source, an antenna circuit associated with said circuit which is resonant to a frequency harmonic to the fundamental, and means for preventing current of the fundamental frequency from flowing in the antenna circuit.

20. Means for producing electromagnetic waves comprising a source of alternating current of a fundamental frequency, an electric circuit associated therewith having means therein for distorting the wave form of the current derived from said source, an antenna circuit associated with said circuit which is resonant to a frequency harmonic to the fundamental, means for preventing current of the fundamental frequency from flowing in the antenna circuit, and means for preventing current of the harmonic frequency for which the antenna circuit is resonant from flowing in said source.

21. Means for producing electromagnetic waves comprising a source of alternating current of the fundamental frequency, an electric circuit associated therewith having means therein for distorting the wave form of the current derived from said source, an antenna circuit associated with said circuit which is resonant to a frequency harmonic to the fundamental, means for preventing current of the fundamental frequency from flowing in the antenna, and means for preventing current of the harmonic frequency for which the antenna circuit is resonant from flowing in said source.

In witness whereof, I have hereunto set my hand this 3rd day of October, 1916.

ERNST F. W. ALEXANDERSON.